(12) United States Patent
Eshwar et al.

(10) Patent No.: US 11,477,031 B2
(45) Date of Patent: *Oct. 18, 2022

(54) NODE CHARACTERIZATION IN A BLOCKCHAIN

(71) Applicant: International Business Machines Corporation, Armonk, NY (US)

(72) Inventors: Bhavani K. Eshwar, Bangalore (IN); Subramanian B. Manjunath, Bangalore (IN); Soma S. Naganna, Bangalore (IN); Subramanian Palaniappan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 16/699,723

(22) Filed: Dec. 1, 2019

(65) Prior Publication Data

US 2020/0106621 A1    Apr. 2, 2020

Related U.S. Application Data

(63) Continuation of application No. 15/431,219, filed on Feb. 13, 2017, now Pat. No. 10,560,268.

(51) Int. Cl.
*G06F 16/00* (2019.01)
*H04L 9/32* (2006.01)
*H04L 67/104* (2022.01)
*H04L 9/00* (2022.01)

(52) U.S. Cl.
CPC .............. *H04L 9/3239* (2013.01); *H04L 9/50* (2022.05); *H04L 67/104* (2013.01); *H04L 2209/56* (2013.01)

(58) Field of Classification Search
CPC ....... G06F 21/6245; G06F 21/57; G06F 9/466
See application file for complete search history.

(56) References Cited

U.S. PATENT DOCUMENTS

| | | | |
|---|---|---|---|
| 7,530,078 B2 | 5/2009 | Collison et al. | |
| 9,123,010 B2 | 9/2015 | Magee et al. | |
| 9,875,510 B1* | 1/2018 | Kasper | ................... G06Q 40/12 |
| 9,967,334 B2* | 5/2018 | Ford | ................... H04L 41/0806 |
| 10,521,775 B2* | 12/2019 | Hearn | ................... H04L 9/3297 |
| 11,244,309 B2* | 2/2022 | Bentov | ................ G06Q 20/389 |
| 2002/0073204 A1 | 6/2002 | Dutta et al. | |
| 2015/0262137 A1 | 9/2015 | Armstrong | |
| 2016/0259937 A1 | 9/2016 | Ford et al. | |

(Continued)

OTHER PUBLICATIONS

List of IBM Patents or Patent Applications Treated as Related, Jan. 6, 2020.

(Continued)

*Primary Examiner* — Debbie M Le (57) ABSTRACT

A blockchain may be used to store transactions in an immutable ledger. The types of transactions may vary and the information from the transactions could be used to identify information about nodes in a particular network. One example operation may include one or more of identifying a number of nodes operating on a blockchain, determining a new blockchain transaction, and determining one or more of the nodes as having one or more characteristics based on the new blockchain transaction.

20 Claims, 5 Drawing Sheets

(56) References Cited

U.S. PATENT DOCUMENTS

| | | |
|---|---|---|
| 2017/0103468 A1 | 4/2017 | Orsini et al. |
| 2017/0236120 A1* | 8/2017 | Herlihy ................ G06Q 20/065 705/67 |
| 2017/0243209 A1 | 8/2017 | Johnsrud et al. |
| 2017/0345011 A1 | 11/2017 | Salami et al. |
| 2018/0130130 A1 | 5/2018 | Dechu et al. |
| 2018/0189755 A1 | 7/2018 | Kilpatrick et al. |
| 2018/0253702 A1* | 9/2018 | Dowding .............. H04L 9/0637 |
| 2018/0285840 A1 | 10/2018 | Hasan |

OTHER PUBLICATIONS

B. Eshwar, "Node Characterization in a Blockchain", U.S. Appl. No. 158/431,219, filed Feb. 13, 2017.

* cited by examiner

NODE CHARACTERIZATION IN A BLOCKCHAIN

TECHNICAL FIELD

This application relates to node characterization, and more particularly, to node characterization in a blockchain.

BACKGROUND

Blockchain is a permission-less distributed database that uses a peer-to-peer network of nodes. Blockchain includes time-stamped blocks with valid transactions via a shared ledger where a participating node can join and leave at any point of time. One current limitation involves a need for every participating node to have ideal characteristics, resulting in a copy of the ledger content owned by every node.

SUMMARY

One example embodiment may include a method comprising one or more of identifying a plurality of nodes operating on a blockchain, determining a new blockchain transaction, and determining one or more of the plurality of nodes as having one or more characteristics based on the new blockchain transaction.

Another example embodiment may include an apparatus that comprises a processor configured to perform one or more of identify a plurality of nodes operating on a blockchain, determine a new blockchain transaction, and determine one or more of the plurality of nodes as having one or more characteristics based on the new blockchain transaction.

Still another example embodiment may include a non-transitory computer readable storage medium configured to store instructions that when executed cause a processor to perform one or more of identifying a plurality of nodes operating on a blockchain, determining a new blockchain transaction, and determining one or more of the plurality of nodes as having one or more characteristics based on the new blockchain transaction.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide characterizing one or more nodes operating in a blockchain environment, sharing the characterization information with other nodes operating in the blockchain environment, a characterization for nodes where characterized nodes discover additional information based on node characterizations which are shared across the network of nodes in a blockchain configuration. One example may include providing a characterization for a node in a shared ledger in which the characterized node discovers additional information based on a node characterization and shares the information with other nodes. In this example, each node may contribute new insights to a ledger which can be used by other peers for various purposes. A callback function may be used after a committed blockchain transaction to provide node characterization and other information about the new blockchain transaction. The characterized node uses the information and discovers the new insights using the new blockchain transaction. The new 'insights' are broadcast to the blockchain network and captured in an insight log.

With a characterization of a node, each node acts as a shared ledger and provides value to the network by having unique characteristics of its own. This type of blockchain network not only acts as a ledger but also contributes to the ledger with new insights which can be used by other peers. The callback functions registered for committed transactions will operate on data that is committed, so actions based on the committed transactions will be taken.

The characterization of a node may be achieved through a callback function, which provides information about the new blockchain transaction. Using the new blockchain transaction each characterized node acts on the information and discovers the new insights. The new insights are broadcast to the blockchain network and the information is captured in the insights logs. The characterization of the node is a 'specialized node' which searches for new insightful information. A social media mediator could be one node, such as a data warehouse node, where a node can perform on-block and off-block data manipulation and submit new finding on the insights logs. The broadcast may be a send out of a new transaction to the different logs (i.e., insights logs, block-transaction log) to all the interested nodes.

Figure 1:
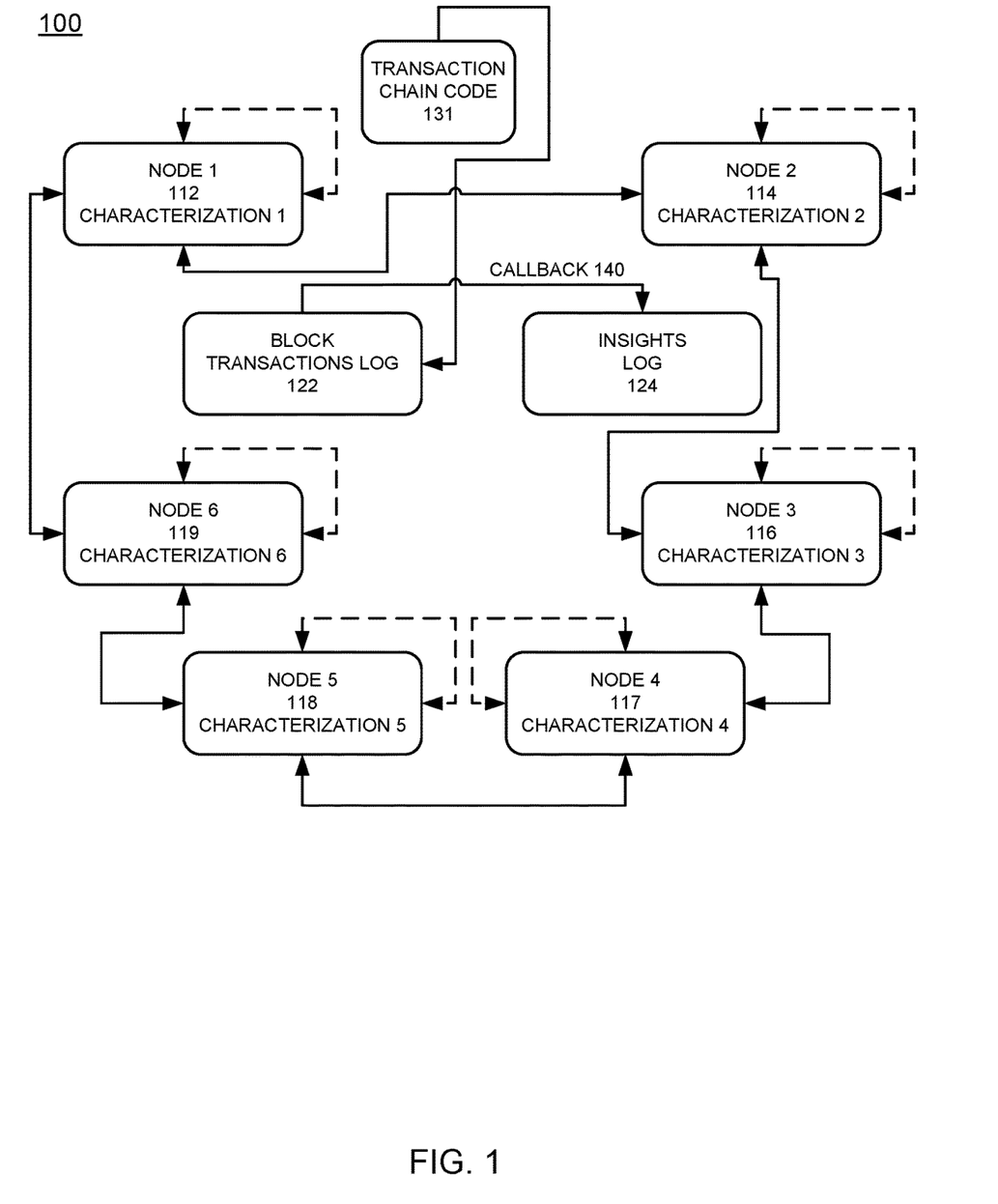
FIG. 1 illustrates a logic block diagram of a blockchain transaction tracking and node characterization configuration according to example embodiments.

FIG. 1 illustrates a logic block diagram of a blockchain transaction tracking and node characterization configuration according to example embodiments. Referring to FIG. 1, the network 100 includes various nodes having corresponding characterizations and also includes blockchain transactions 122 and an insights log 124. The node characterizations are identified each time the node communicates with other nodes, processes a blockchain transaction or performs any type of operation which would yield characterization identification. For example, nodes 112, 114, 116, 117, 118 and 119 each may be part of a peer-to-peer network. The nodes may communicate and identify characterizations about the node itself or neighboring nodes. Once the characterizations are identified, the characterizations may be logged in an insights log 124. The characterizations may be identified from a block transactions log 122 after one or more transaction chain codes 131. A callback function 140 may be used to provide information about a new transaction which includes characterization information of the nodes included in the blockchain transaction. FIG. 1 depicts different nodes as part of the blockchain, having a characterization on a per node basis. The dotted lines illustrate a node calling itself and the callback is a configuration at each node which will be hooked to the callback function. A node may be a device which includes a processor and memory and the logs may be stored on a device that includes a processor and memory.

Types of characterization may include entity extraction, text mining, information analysis and discovery, compliance, semantic extraction, and ontology based entity discovery. In one example, it is assumed that the primary responsibility of the blockchain is digital currency transfer. In this case, the blockchain may have three active nodes and one of the nodes is characterized for anti-money laundering (AML) and this node performs an analysis of currency transfer against a daily limit as well as an entity that is being tracked. Based on the type of transaction there will be a real-time/off-line notification that is sent to the regulatory authority. The regulatory authority may only identify a violation/entity description as the remainder of the information is not accessible per a governing policy of the blockchain system. With regard to characterization, when a transaction is executed as part of a smart contract, the callback function acts as the incoming data which is read by the specific nodes which identify the characteristics. For example, 'node 1' will identify a social media handle if present, then perform analytics based on the products that are popular within the blockchain community. Such findings will be placed back into an insights log. If a node is characterized for AML detection, this node will alter all the nodes by a flag, and one node will provide this information to a regulatory authority. Characterization is based on a node-specific activity performed, and the insights that are brought from that particular node. In this example, if the specific node performs an entity extraction based on the transaction content, then that node is characterized for entity extraction.

According to one example, consider a two-node communication path with a node on each end. The first node is responsible for entity extraction and the second node is responsible for text mining. As a result, the first node is characterized for entity extraction and the second node is characterized for text mining. When a blockchain transaction occurs, the second node extracts the customer data through the text/data in the blockchain transaction. This entity data is placed into the insights log. A transaction will be read by the first node which will perform the entity matching based on the entities to match. The first node identifies a duplicate of the entities that are already present. As such, the 'entity duplicate' information will be placed in the insights log. The insights log will include various items, one of which is an entity list based on text mining and entity match details.

Every node registers a set of functions to be called when a new transaction occurs on the blockchain node. The registered functions are called 'callbacks'. As an example, the invoke function is called whenever a transaction is executed on the blockchain. Now, the data that is received form the blockchain will be passed on to the registered functions and all the registered function will have executed a method by default and this method will be called by passing an array of data. Now that the data being received is known, the registered function will know what action needs to be taken. For example, if a node is registered for performing text mining, that node will place the transaction content and will perform the text mining. The mined data will be placed back as a blockchain transaction (i.e., insights log) and this will, in turn, trigger the entity matching based on registered functions of the nodes.

In one example embodiment, a unique character may be used to represent every participating node within a blockchain. A callback/trigger mechanism may be used to call the specific node's assigned character to input a new insight into the log ledger of the blockchain. The node character may assist with generating events that are passed back into the blockchain for committing a transaction or generating a new transaction as violations are identified by the previous transactions. A callback function may be used to trigger a characterized node after the commitment of the blockchain transaction. The callback function is a program or programs which are associated with the smart contract, and are configurable based on the node characterization. The smart contracts deployed will have hooks to provide information for that specific node, and the hook will call registered programs for those particular nodes.

Figure 2:
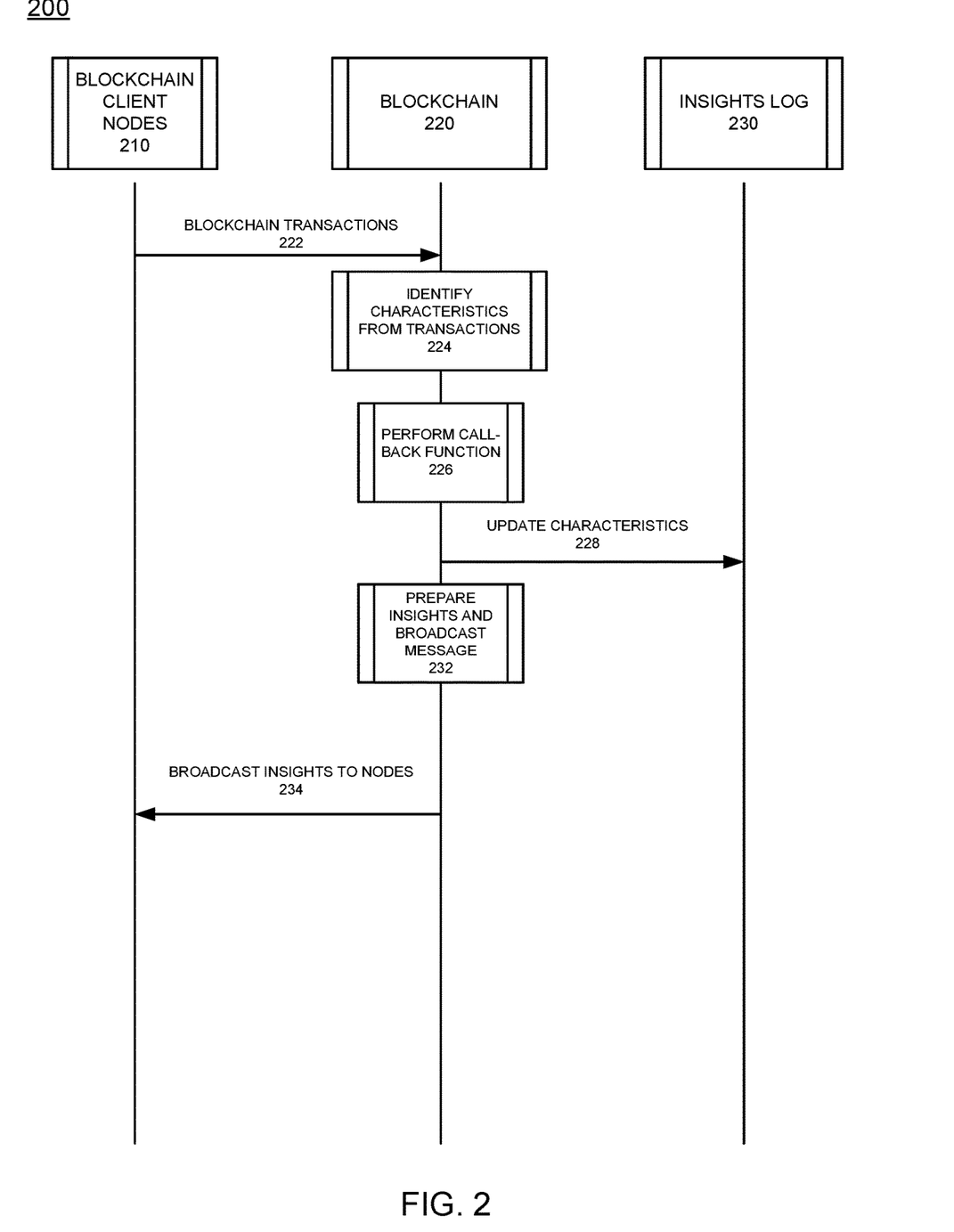
FIG. 2 illustrates a system signaling diagram of a blockchain transaction tracking configuration according to example embodiments.

FIG. 2 illustrates a system signaling diagram of a blockchain transaction tracking configuration according to example embodiments. Referring to FIG. 2, the system 200 includes one or more blockchain client nodes 210, a blockchain 220 and an insights log 230 which is used to store characterizations of the nodes. In operation, blockchain transactions 222 are received at the blockchain 220 and characteristics from the transactions 224 are identified. A call-back function is performed 226 and the characteristics are updated 228 and written to an insights log 230. The insights 232 may be prepared and provided to the blockchain 220 in the form of a broadcast 232. The broadcast may be a message 234 that is sent to all client nodes operating on the blockchain. The insights log is an example of something a node discovered which can be useful for the other nodes. An example could be relationships with products and experiences that the blockchain community may find interesting.

Figure 3A:
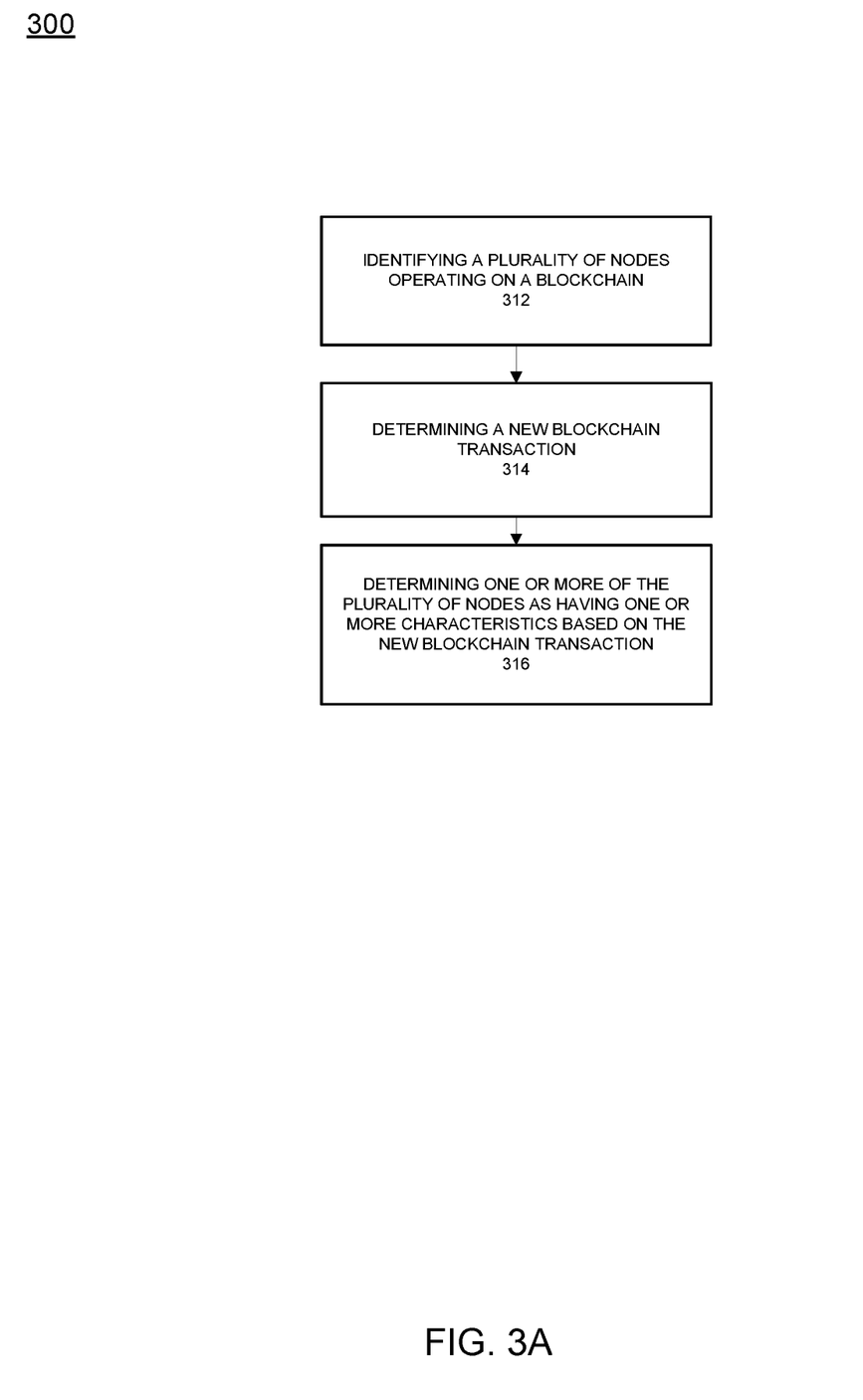
FIG. 3A illustrates a flow diagram of an example method of operation according to example embodiments.

FIG. 3A illustrates a flow diagram of an example method of operation according to example embodiments. Referring to FIG. 3A, the method 300 may include one or more of identifying a plurality of nodes operating on a blockchain 312, determining a new blockchain transaction 314, and determining one or more of the plurality of nodes as having one or more characteristics based on the new blockchain transaction 316. The one or more characteristics can include one or more of entity extraction, text mining, information analysis and discovery, compliance, semantic extraction, and ontology-based entity discovery. The method may also include performing a callback function to identify the one or more characteristics of the one or more of the plurality of nodes and provide transaction information associated with the new blockchain transaction. The callback function is performed after the new blockchain transaction has been committed to the blockchain. The callback functions are among two types, one is a before callback and other is an after callback. If the programs are registered for 'before' commit, the corresponding action will be taken and consensus will not be met by this node. The method may also provide broadcasting the one or more characteristics to the plurality of nodes operating on the blockchain and creating a log to store the one or more characteristics. The log is stored in a log ledger of the blockchain.

Figure 3B:
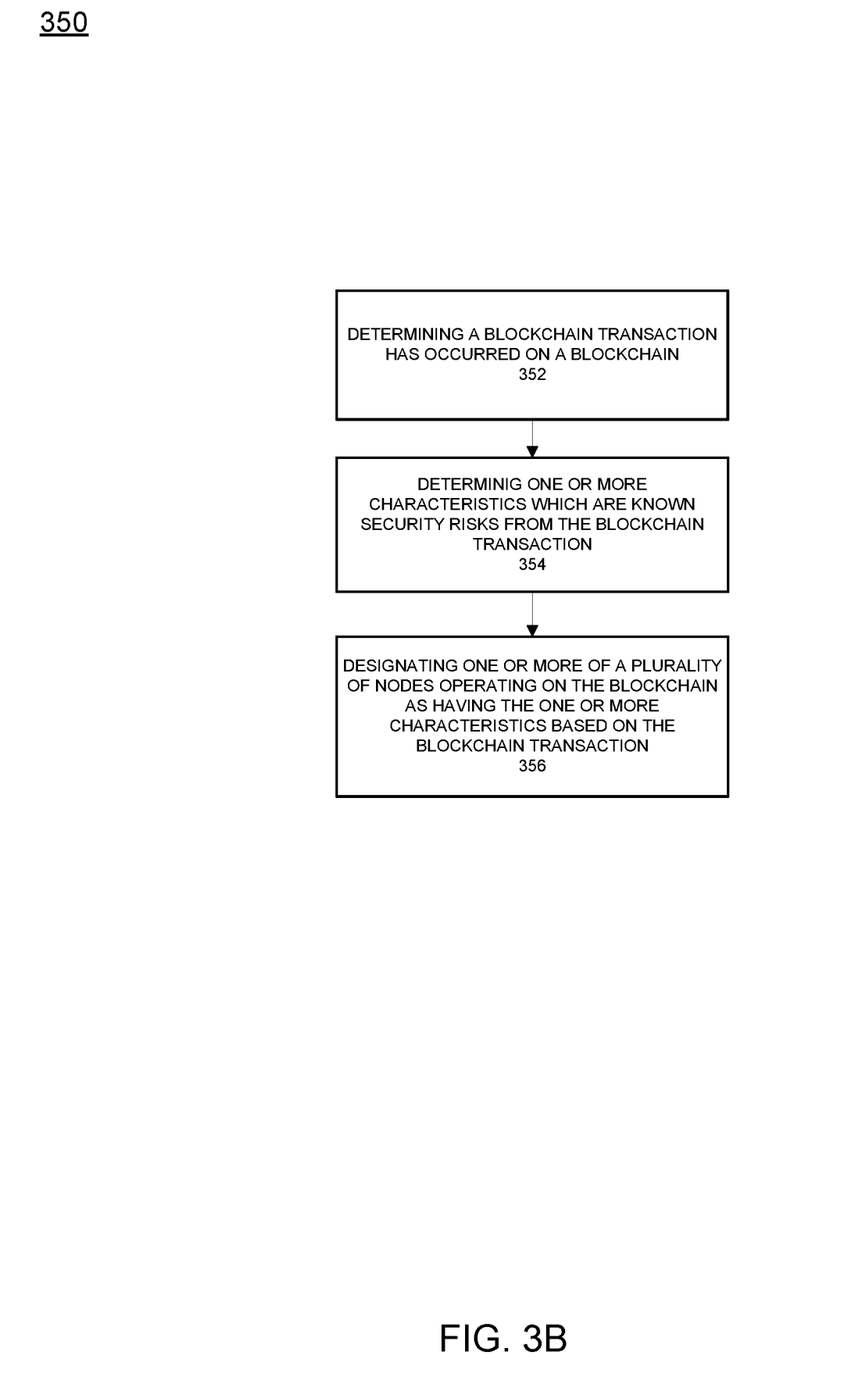
FIG. 3B illustrates a flow diagram of an example method of operation according to example embodiments.

Security may be the reason for identifying and tracking characteristics to enhance/increase the types of characteristics. In another example, FIG. 3B illustrates a flow diagram of an example method of operation according to example embodiments. Referring to FIG. 3B, the method 350 includes one or more of determining a blockchain transaction has occurred on a blockchain 352, determining one or more characteristics which are known security risks from the blockchain transaction 354, and designating one or more of a plurality of nodes operating on the blockchain as having the one or more characteristics based on the blockchain transaction 356. This security risk identification example may provide a way to track and identify known risks to reduce the likelihood of a security breach.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
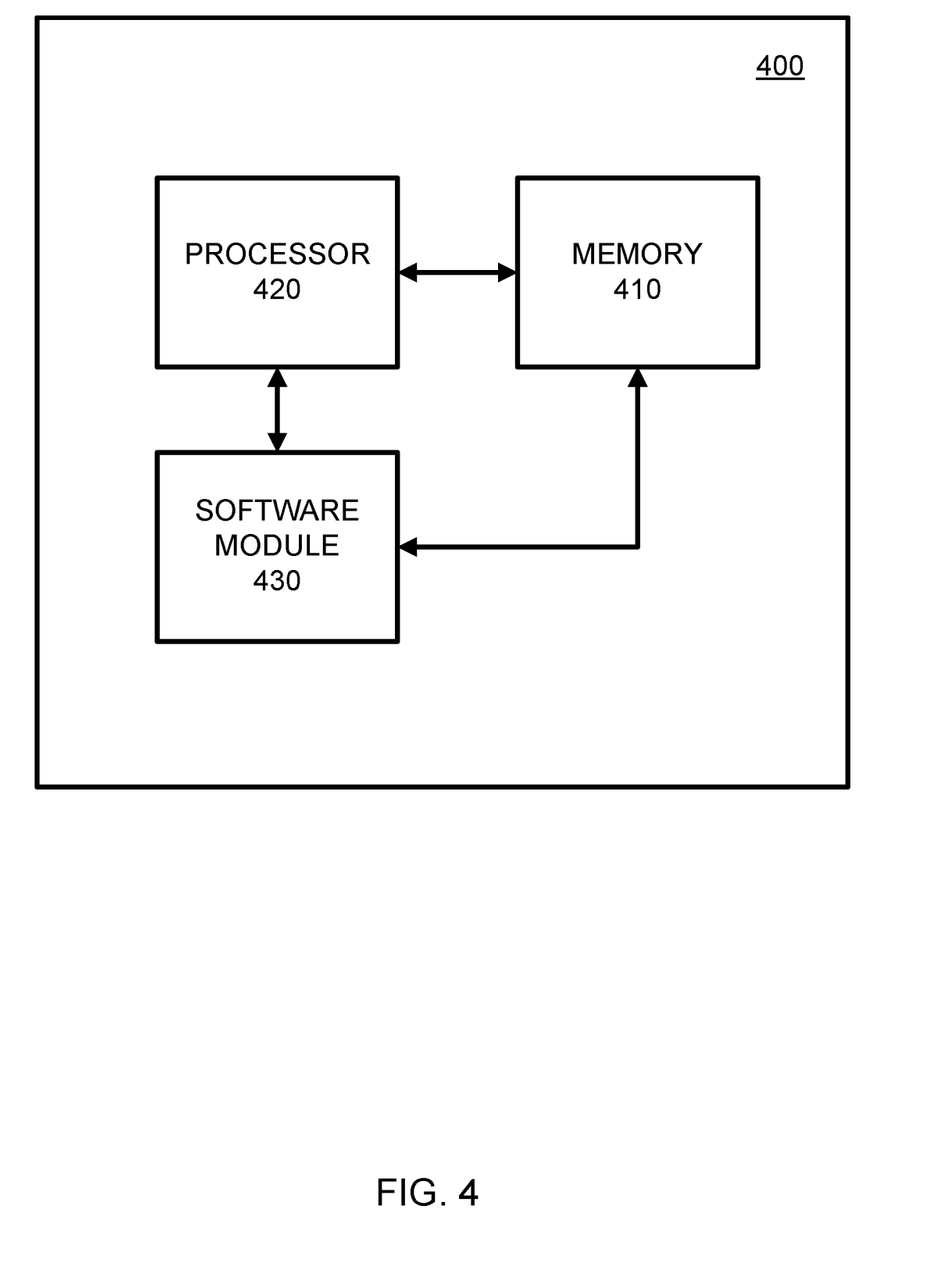
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method, comprising:
identifying characterization information associated with one or more nodes, of a plurality of nodes of a blockchain network, based on a callback function that identifies activity performed by the one or more nodes upon execution of a new blockchain transaction; and
broadcasting information related to the characterization information to the plurality of nodes.

2. The computer-implemented method of claim 1, wherein the characterization information comprises one or more of:
information regarding entity extraction, information regarding text mining, information analysis and discovery, information regarding compliance, information regarding semantic extraction, and information regarding ontology-based entity discovery.

3. The computer-implemented method of claim 1, comprising:
identifying the plurality of nodes.

4. The computer-implemented method of claim 1, comprising:
performing the callback function after the new blockchain transaction has been committed to the blockchain.

5. The computer-implemented method of claim 1, comprising:
determining the new blockchain transaction.

6. The computer-implemented method of claim 1, comprising:
storing the information related to the characterization information in a log.

7. The computer-implemented method of claim 6, wherein the log is stored in a log ledger of a blockchain of the blockchain network.

8. An apparatus, comprising:
a processor configured to:
identify characterization information associated with one or more nodes, of a plurality of nodes of a blockchain network, based on a callback function that identifies activity performed by the one or more nodes upon execution of a new blockchain transaction; and
broadcast information related to the characterization information to the plurality of nodes.

9. The apparatus of claim 8, wherein the characterization information comprises one or more of:
information regarding entity extraction, information regarding text mining, information analysis and discovery, information regarding compliance, information regarding semantic extraction, and information regarding ontology-based entity discovery.

10. The apparatus of claim 8, wherein the processor is configured to:
identify the plurality of nodes.

11. The apparatus of claim 8, wherein the processor is configured to:
execute the callback function after the new blockchain transaction has been committed to the blockchain.

12. The apparatus of claim 8, wherein the processor is configured to:
determine a new blockchain transaction.

13. The apparatus of claim 8, wherein the processor is configured to:
create a log to store the one or more characteristics.

14. The apparatus of claim 13, wherein the processor is configured to:
store the log in a log ledger of a blockchain of the blockchain network.

15. A non-transitory computer readable storage medium configured to store one or instructions that when executed by a processor of a blockchain in a blockchain network causes the processor to perform:
identifying characterization information associated with one or more nodes, of a plurality of nodes of the blockchain network, based on a callback function that identifies activity performed by the one or more nodes upon execution of a new blockchain transaction; and
broadcasting information related to the characterization information to the plurality of nodes.

16. The non-transitory computer readable storage medium of claim 15, wherein the characterization information comprises one or more of:
information regarding entity extraction, information regarding text mining, information analysis and discovery, information regarding compliance, information regarding semantic extraction, and information regarding ontology-based entity discovery.

17. The non-transitory computer readable storage medium of claim 15, wherein the one or more instructions further cause the processor to perform:
identifying the plurality of nodes.

18. The non-transitory computer readable storage medium of claim 15, wherein the one or more instructions further cause the processor to perform:
executing the callback function after the new blockchain transaction has been committed to the blockchain.

19. The non-transitory computer readable storage medium of claim 15, wherein the one or more instructions further cause the processor to perform:
determining a new blockchain transaction.

20. The non-transitory computer readable storage medium of claim 15, wherein the one or more instructions further cause the processor to perform:

creating a log to store the characterization information, wherein the log is stored in a log ledger of a blockchain of the blockchain network.

\* \* \* \* \*